United States Patent
Lin

(10) Patent No.: US 7,046,917 B1
(45) Date of Patent: May 16, 2006

(54) SPEED CONTROLLING DEVICE OF A MOTORIZED CART FOR A PERSON TO RIDE ON

(75) Inventor: Samuel Lin, Chia Yi (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 0 days.

(21) Appl. No.: 11/033,140

(22) Filed: Jan. 12, 2005

(51) Int. Cl.
*H02P 7/288* (2006.01)

(52) U.S. Cl. .................. 388/824; 388/809; 388/816; 180/6.2; 180/6.5; 180/6.24; 180/6.28

(58) Field of Classification Search ............. 388/809, 388/816, 824; 180/6.2, 6.5, 6.24, 6.28
See application file for complete search history.

(56) References Cited

U.S. PATENT DOCUMENTS

| | | | | |
|---|---|---|---|---|
| 3,814,199 A | * | 6/1974 | Jones ................. | 180/6.5 |
| 3,909,689 A | * | 9/1975 | Selby et al. .......... | 318/257 |
| 3,952,822 A | * | 4/1976 | Udden et al. ......... | 180/216 |
| 3,990,319 A | * | 11/1976 | Hofer ................. | 74/471 XY |
| 4,207,959 A | * | 6/1980 | Youdin et al. ......... | 180/167 |
| 4,520,300 A | * | 5/1985 | Fradella .............. | 318/603 |
| 4,634,941 A | * | 1/1987 | Klimo ................ | 318/139 |
| 4,671,524 A | * | 6/1987 | Haubenwallner ...... | 280/212 |
| 4,773,495 A | * | 9/1988 | Haubenwallner ...... | 180/65.2 |
| 5,517,098 A | * | 5/1996 | Dong ................. | 318/581 |
| 5,555,949 A | * | 9/1996 | Stallard et al. ........ | 180/6.5 |
| 5,687,443 A | * | 11/1997 | Moore ................ | 15/98 |
| 5,991,505 A | * | 11/1999 | Frank ................. | 388/828 |

* cited by examiner

*Primary Examiner*—Rita Leykin
(74) *Attorney, Agent, or Firm*—Rosenberg, Klein & Lee

(57) ABSTRACT

A device of a cart includes a control, a speed regulating potentiometer, a microprocessor, a digital-to-analogue converter, a motor controlling unit, and a switch; the control is angularly displaceable and near to handlebars of the cart; the potentiometer is connected to the control so as to output a voltage, which depends on displacement of the control; the microprocessor can produce digital signals according to the output voltage of the potentiometer; the converter is used for converting the digital signals into analogue voltage; the motor controlling unit is used for making a motor run at a variable-speed mode, at which mode the speed of the motor will depend on output voltage of the converter; immediately after the rider presses the switch, the microprocessor will ignore output voltage of the potentiometer, and start and continue giving a same digital signal to the converter so that the motor starts running at constant speed.

6 Claims, 3 Drawing Sheets

SPEED CONTROLLING DEVICE OF A MOTORIZED CART FOR A PERSON TO RIDE ON

BACKGROUND OF THE INVENTION

1. Field of the Invention

The present invention relates to a speed controlling device of a cart for a person to ride on, more particularly one, which can make the cart move at a constant speed.

2. Brief Description of the Prior Art

Motorized carts, which are provided for a person to ride on, are very convenient vehicles for leg-handicapped people and the elderly. However, there is still much room for improvement on the speed controlling mechanism of conventional motorized carts for a person to ride on.

SUMMARY OF THE INVENTION

It is a main object of the invention to provide a speed controlling device to a motorized cart for a person to ride on, which is easy to use, and can make the cart move at a constant speed.

The speed controlling device includes a control member, a speed regulating potentiometer, a wave filter, a microprocessor, a D/A converter, a motor controlling unit, and a constant-speed control switch. The control member is angularly displaceable and usable for controlling the speed controlling device. The speed regulating potentiometer includes variable resistors, and it is connected to the control member so as to output voltage, which depends on the angular displacement of the control member. The wave filter is connected to the speed regulating potentiometer to work as a filter for output voltage of the speed regulating potentiometer. The microprocessor is connected to the wave filter, and it can produce digital signals according to the output voltage of the wave filter, which digital signals will be output via an output terminal of the microprocessor. The D/A converter is connected to the output terminal of the microprocessor for converting the digital signals into an analogue voltage. The motor controlling unit is connected to both a motor of a cart and an output terminal of the digital-to-analogue converter for making the motor run at a variable-speed mode, at which mode the speed of the motor will depend on output analogue voltage of the D/A converter, thus making speed of the cart depend on the angular displacement of the control member. The constant-speed control switch is connected to an input terminal of the microprocessor, which will ignore output voltage of the wave filter, and start and continue giving a same stable digital signal to the D/A converter immediately after the constant-speed control switch is used to start a constant-speed mode, at which mode the motor will run at a constant speed.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
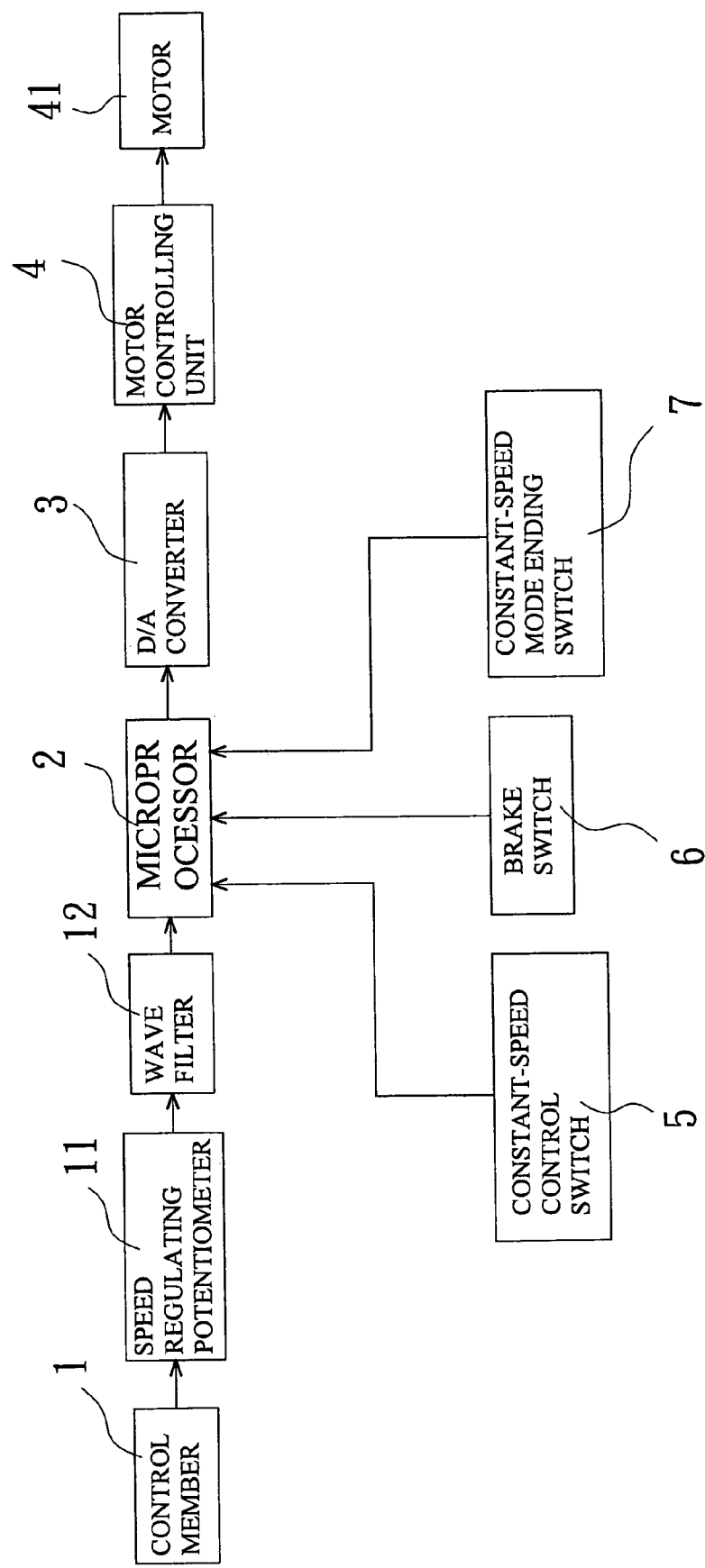
FIG. 1 is a block diagram of the speed controlling device of a cart for a person to ride on according to the present invention.
Figure 2:
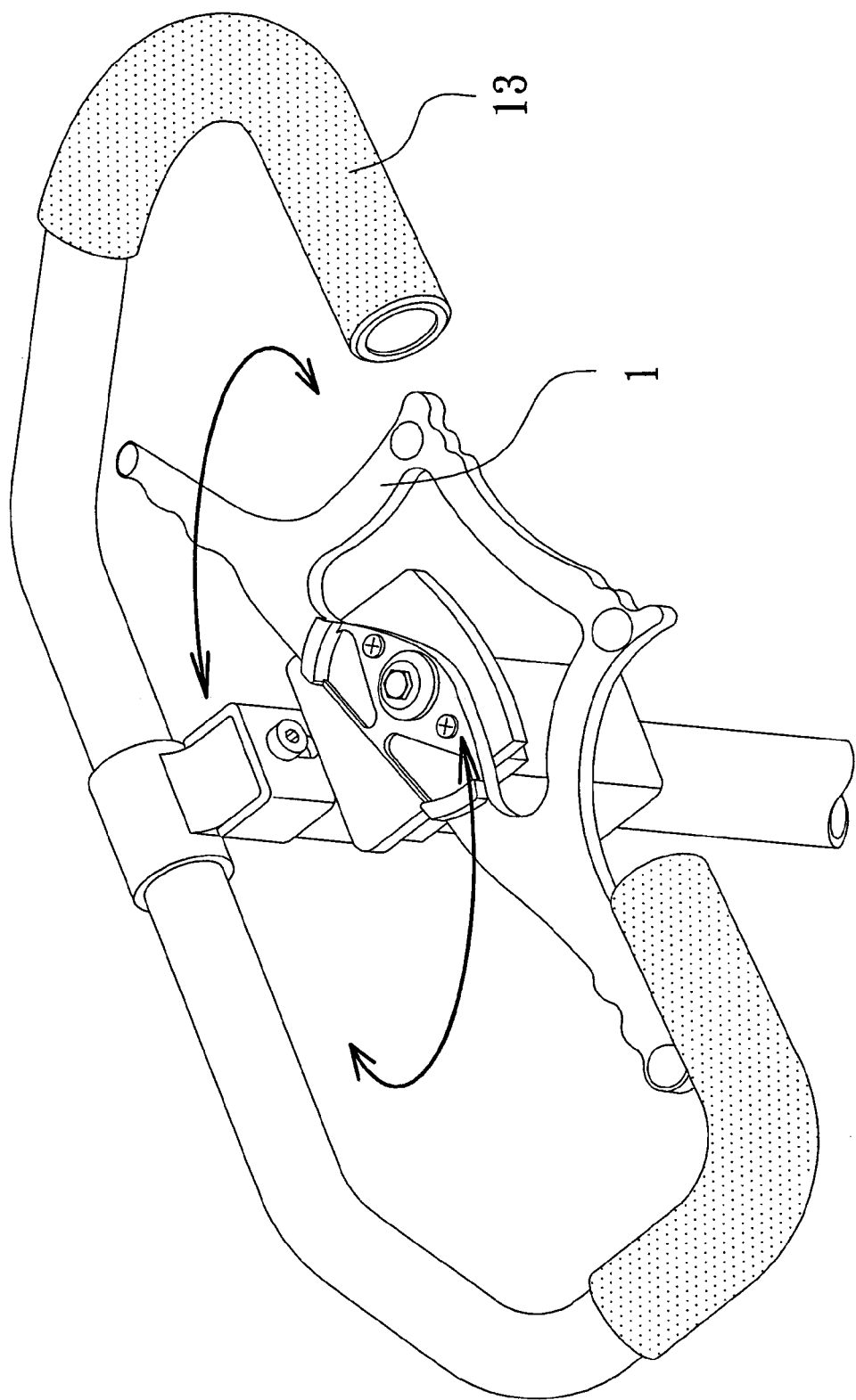
FIG. 2 is a perspective view of the handlebars of the cart and the control member of the speed controlling device of the invention.

Referring to FIGS. 1 and 2, a preferred embodiment of a speed controlling device of a motorized cart, which is provided for a person to ride on, includes a control member 1, a speed regulating potentiometer 11, a wave filter 12, a microprocessor 2, a digital-to-analogue (D/A) converter 3, a motor controlling unit 4, a constant-speed control switch 5, a brake switch 6, and a constant-speed mode ending switch 7.

The control member 1 is angularly displaceable, and is near to handlebars 13 of the cart for the rider to use to control the present speed-controlling device, which handlebars 13 are connected to an upper end of a rotary stem 81. Furthermore, an annular object 82, which has a front portion 821, is secured around a lower end portion of the rotary stem 81.

The speed regulating potentiometer 11 includes variable resistors, and it is connected to the control member 1 such that output voltage of the speed regulating potentiometer 11 depends on the displacement of the control member 1.

The wave filter 12 is connected to an output terminal of the speed regulating potentiometer 11 to work as a filter for the output voltage of the speed regulating potentiometer 11.

The microprocessor 2 is connected to an output terminal of the wave filter 12 at an input terminal thereof. The microprocessor 2 will produce digital signals according to the output voltage of the wave filter 12, and it will output the digital signals.

The digital-to-analogue converter 3 is connected to an output terminal of the microprocessor 2, and it will convert the digital signals of the microprocessor 2 into an analogue voltage.

The motor controlling unit 4 is connected to a motor 41 of the cart, and an output terminal of the digital-to-analogue converter 3. The motor controlling unit 4 will make the motor 41 run at a variable-speed mode, at which variable-speed mode the speed of the motor 41 will depend on the output analogue voltage of the digital-to-analogue converter 3, thus making the speed of the cart depend on the angular displacement of the control member 1.

Consequently, the more degrees the control member 1 is turned away from the forward direction of the cart, the higher speed the cart will move at. In other words, the speed of the cart is substantially in direct proportion to the angular displacement of the control member 1.

The constant-speed control switch 5 is electrically connected to an input terminal of the microprocessor 2. The microprocessor 2 will ignore output voltage of the wave filter 12, and start and continue giving a same stable digital signal to the digital-to-analogue converter 3 instead immediately after the constant-speed control switch 5 is used to start the constant-speed mode; thus, the digital-to-analogue converter 3 will start and continue outputting a same voltage to the motor controlling unit 4, and the motor 41 will run at a constant speed for the cart to move at a constant speed. While the cart is moving at the constant-speed mode, the constant-speed mode will be ended, and the microprocessor 2 will start to take output voltage of the wave filter 12 again as soon as the constant-speed control switch 5 is pressed again; thus, the speed of the motor 41 starts to depend on the displacement of the control member 1 again.

The brake switch 6 is electrically connected to an input terminal of the microprocessor 2. While the cart is moving at the constant-speed mode, the brake switch 6 will be moved to the closed position, and the variable-speed mode will be used instead of the constant-speed mode as soon as the rider brakes; the microprocessor 2 will start to take output voltage of the wave filter 12 instead of continuing to output a same stable digital signal. Consequently, the speed of the motor 41 starts to depend on the displacement of the control member 1 again for avoiding danger.

Furthermore, while the cart is moving at the constant-speed mode, the variable-speed mode will be used instead of the constant-speed mode as soon as the control member 1 is turned for more than 2.5° away from the forward direction of the cart; the microprocessor 2 will start to take output voltage of the wave filter 12 again. Consequently, the speed of the motor 41 will gradually change to a speed according to the displacement of the control member 1, and start to depend on the displacement of the control member 1 again for avoiding danger.

The constant-speed mode ending switch 7 is electrically connected to an input terminal of the microprocessor 2. The constant-speed mode ending switch 7 will be moved to the closed position, and the variable-speed mode will be used instead of the constant-speed mode as soon as the handlebars 13 is turned for more than 25° away from the forward direction of the cart. Consequently, the speed of the motor 41 will gradually change into a speed of the variable-speed mode, and start to depend on the displacement of the control member 1 again for avoiding danger.

Figure 3:
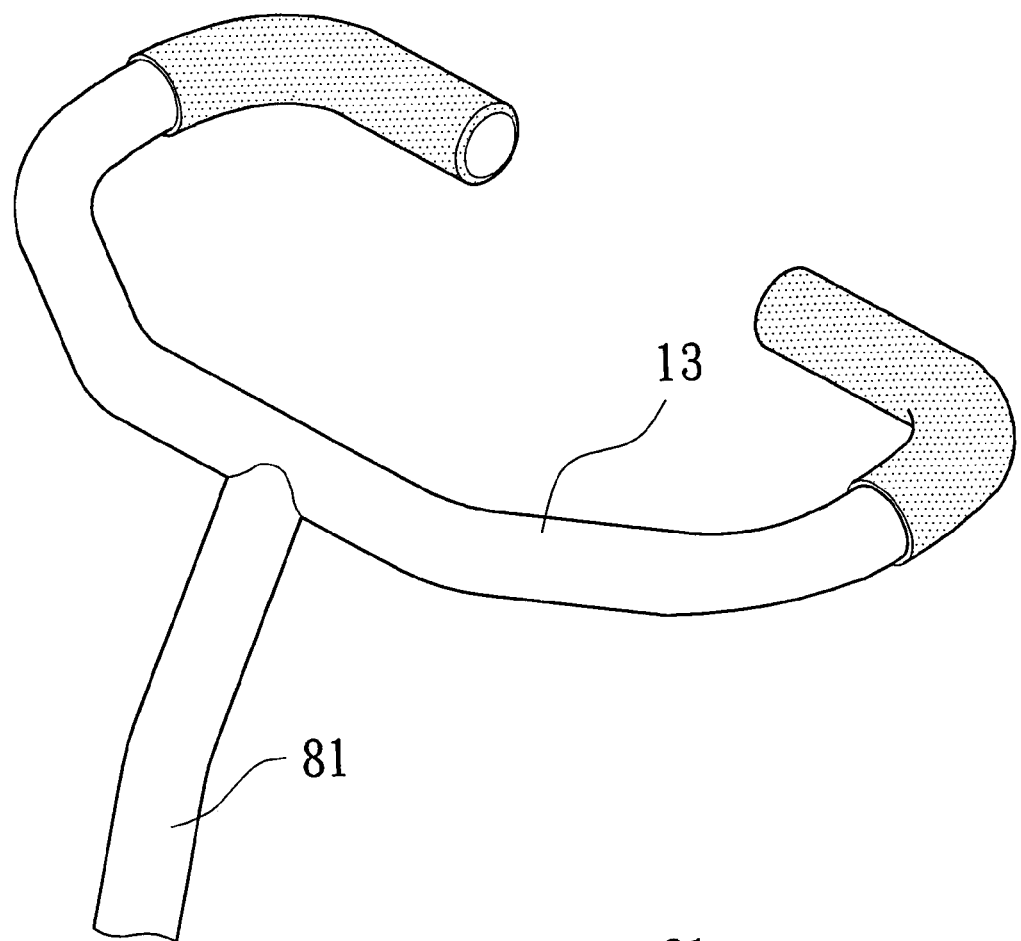
FIG. 3 is a perspective view of the constant-speed mode ending switch and the related parts according to the present invention.
Figure 4:
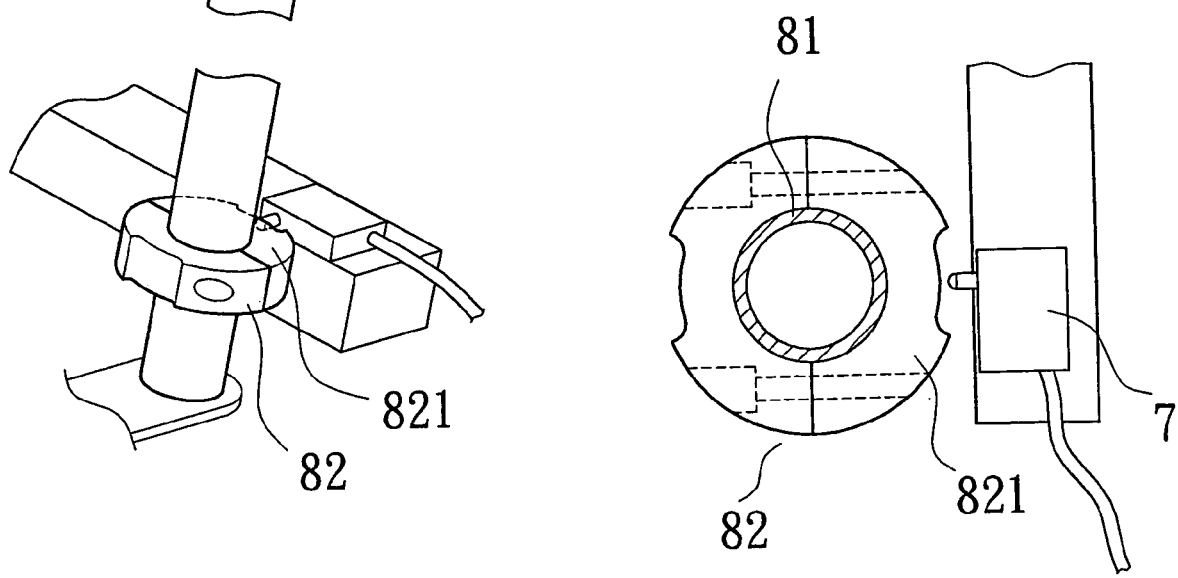
FIG. 4 is a sectional view of those parts of the present invention that are related to the constant-speed mode ending switch.

Referring to FIGS. 3 and 4, the constant-speed mode ending switch 7 of the present embodiment is arranged near to the front portion 821 of the annular object 82 such that the constant-speed mode ending switch 7 will be pressed by the front portion 821 of the annular member 82 as soon as the handlebars 13 is turned for more than 25° away from the forward direction of the cart. Therefore, as soon as the constant-speed mode ending switch 7 is pressed, the microprocessor 2 will end the constant-speed mode, and the speed of the motor 41 will gradually change into a speed of the variable-speed mode, and start to depend on the displacement of the control member 1 again.

From the above description, it can be easily understood that the speed controlling device of the present invention has the following advantages:

1. The speed controlling device will make the cart move at a constant speed when the constant-speed control switch 5 is pressed.

2. The constant-speed mode will be ended as soon as the constant-speed control switch 5 is pressed again. Therefore, the speed controlling device is easy to use.

3. The constant-speed mode will be ended as soon as the rider brakes sharply, thus avoiding danger.

4. While the cart is moving at the constant-speed mode, the variable-speed mode will be used instead of the constant-speed mode as soon as the handlebars of the cart are turned too many degrees, e.g. 25 degrees, away from the forward direction; thus, the speed of the motor 41 will start to depend on the displacement of the control member 1 again for avoiding danger.

5. While the cart is moving at the constant-speed mode, the variable-speed mode will be used instead of the constant-speed mode as soon as the control member is turned for more than 2.5° away from the forward direction; thus, the speed of the motor will gradually change to a speed according to the displacement of the control member, and start to depend on the displacement of the control member 1 again.

What is claimed is:

1. A speed controlling device of a motorized cart for a person to ride on, comprising
    an angularly displaceable control member usable for controlling the speed controlling device;
    a speed regulating potentiometer including at least one variable resistor; the speed regulating potentiometer being connected to the control member so as to output voltage, which depends on angular displacement of the control member;
    a wave filter connected to an output terminal of the speed regulating potentiometer to work as a filter for output voltage of the speed regulating potentiometer;
    a microprocessor connected to an output terminal of the wave filter at an input terminal thereof; the microprocessor being capable of producing digital signals according to output voltage of the wave filter, which digital signals will be output via an output terminal of the microprocessor;
    a digital-to-analogue converter connected to the output terminal of the microprocessor for converting digital signals of the microprocessor into an analogue voltage;
    a motor controlling unit connected to both a motor of a motorized cart and an output terminal of the digital-to-analogue converter for making the motor run at a variable-speed mode, at which variable-speed mode speed of the motor will depend on output analogue voltage of the digital-to-analogue converter, thus making speed of the cart depend on angular displacement of the control member;
    a constant-speed control switch electrically connected to an input terminal of the microprocessor; the microprocessor being going to ignore output voltage of the wave filter, and being going to start and continue giving a same stable digital signal to the digital-to-analogue converter immediately after the constant-speed control switch is used to start a constant-speed mode, at which constant-speed mode the motor will run at a constant speed for the cart to move at a constant speed; the digital-to-analogue converter being going to output a same voltage to the motor controlling unit when the microprocessor gives a same stable digital signal to the digital-to-analogue converter.

2. The speed controlling device as claimed in claim 1, wherein while the cart is moving at the constant-speed mode, the constant-speed mode will be ended, and the microprocessor will start to take output voltage of the wave filter again as soon as the constant-speed control switch is pressed again; thus, speed of the motor starts to depend on angular displacement of the control member again.

3. The speed controlling device as claimed in claim 1, wherein a brake switch is electrically connected to an input terminal of the microprocessor; while the cart is moving at the constant-speed mode, the brake switch will be moved to a closed position, and the variable-speed mode will be used instead of the constant-speed mode as soon as a rider of the cart brakes; thus, the microprocessor will start to take output voltage of the wave filter instead of continuing to output a same stable digital signal, and speed of the motor will start to depend on angular displacement of the control member again.

4. The speed controlling device as claimed in claim 1, wherein the control member is arranged near to handlebars of the cart, and speed of the cart is substantially in direct proportion to angular displacement of the control member;

while the cart is moving at the constant-speed mode, the variable-speed mode being going to be used instead of the constant-speed mode, and speed of the motor being going to gradually change to a speed depending on angular displacement of the control member as soon as the control member is turned for more than 2.5° away from a forward direction.

5. The speed controlling device as claimed in claim 1, wherein a constant-speed mode ending switch is electrically connected to an input terminal of the microprocessor; while the cart is moving at the constant-speed mode, the constant-speed mode ending switch will be moved to a closed position, and the variable-speed mode will be used instead of the constant-speed mode as soon as handlebars of the cart is turned for more than 25° away from a forward direction of the cart; thus, the microprocessor will start to take output voltage of the wave filter instead of continuing to output a same stable digital signal, and speed of the motor will start to depend on angular displacement of the control member again.

6. The speed controlling device as claimed in claim 5, wherein the handlebars are connected to an upper end of a rotary stem, and an annular object, which has a front portion, is secured around the rotary stem, and the constant-speed mode ending switch is arranged near to the front portion of the annular object such that the constant-speed mode ending switch will be pressed, and moved to the closed position by the front portion of the annular member as soon as the handlebars is turned for more than 25° away from the forward direction.

* * * * *